United States Patent
Andrew

(10) Patent No.: US 6,804,402 B2
(45) Date of Patent: Oct. 12, 2004

(54) METHOD AND APPARATUS FOR HIERARCHICALLY ENCODING AND DECODING AN IMAGE

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/272,364

(22) Filed: Mar. 19, 1999

(65) Prior Publication Data

US 2003/0063809 A1 Apr. 3, 2003

(30) Foreign Application Priority Data

Mar. 20, 1998 (AU) ............................................. PP2482

(51) Int. Cl.[7] ................................................. G06K 9/36
(52) U.S. Cl. ..................................... 382/240; 382/250
(58) Field of Search ................................ 382/240, 232, 382/246, 248, 233, 250; 375/240.03, 240.2, 240.24, 240.1, 240.11, 240.19; 358/433

(56) References Cited

U.S. PATENT DOCUMENTS

| | | | |
|---|---|---|---|
| 5,142,656 A | * 8/1992 | Fielder et al. | 704/203 |
| 5,157,488 A | * 10/1992 | Pennebaker | 375/240.04 |
| 5,301,018 A | * 4/1994 | Smidth et al. | 348/472 |
| 5,321,776 A | * 6/1994 | Shapiro | 358/426 |
| 5,339,108 A | * 8/1994 | Coleman et al. | 375/240.2 |
| 5,359,676 A | 10/1994 | Fan | 382/56 |
| 5,371,841 A | * 12/1994 | Jones | 345/619 |
| 5,434,567 A | * 7/1995 | Mack et al. | 341/50 |
| 5,621,465 A | 4/1997 | Kondo | 348/395 |
| 5,748,116 A | * 5/1998 | Chui et al. | 341/50 |
| 5,905,815 A | * 5/1999 | Mack et al. | 358/433 |
| 6,157,746 A | * 12/2000 | Sodagar et al. | 382/240 |
| 6,175,650 B1 | * 1/2001 | Sindhu et al. | 358/430 |
| 6,545,687 B2 | * 4/2003 | Scott et al. | 345/629 |

FOREIGN PATENT DOCUMENTS

| | | |
|---|---|---|
| EP | 0565223 | 10/1993 |
| EP | 0651562 A1 | * 3/1995 |

OTHER PUBLICATIONS

Fischer et al., "A comparison of vector quantization subband and transform coding of imagery", IEEE International Symposium on Circuits and Systems, May 1989.*
Wallace et al., "The JPEG Still Picture Standard", IEEE transactions on Consumer Electronics, Feb. 1992.*
Rabbani et al., Digital Image Compression Techniques, SPIE Optical Engineering Press, vol. TT 7, copyright 1991 and received by the PTO library Feb., 1993 (hereinafter Rabbani).*
Monro et al., "Zerotree coding of DCT coefficients", IEEE International Conference on Image processing, Oct. 29, 1997.*

* cited by examiner

*Primary Examiner*—Mehrdad Dastouri
(74) *Attorney, Agent, or Firm*—Fitzpatrick, Cella, Harper & Scinto

(57) ABSTRACT

The method of encoding divides the image into a number of blocks, which are then transformed (200), in accordance with a linear transform, into blocks of transform coefficients. The transform coefficients are rearranged (202) into a set of groups, wherein subsets of the groups of coefficients are capable of being inversed transformed to reproduce the image or a resolution thereof. The groups (203) are then encoded in turn. In the method of decoding, a user first selects a resolution mode and the method decodes (300) a predetermined number of groups in response to said resolution mode. The method then rearranges (301) the decoded groups to form blocks of transform coefficients, wherein the arrangement is determined in response to the resolution mode. The method then inverse transforms said rearrangement (303), if necessary, wherein the inverse transform is dependent on the resolution mode and combines the blocks of pixels to reconstitute the image or a resolution thereof.

42 Claims, 10 Drawing Sheets

$$\begin{bmatrix} 0 & 1 & 4 & 4 & 7 & 7 & 7 & 7 \\ 2 & 3 & 4 & 4 & 7 & 7 & 7 & 7 \\ 5 & 5 & 6 & 6 & 7 & 7 & 7 & 7 \\ 5 & 5 & 6 & 6 & 7 & 7 & 7 & 7 \\ 8 & 8 & 8 & 8 & 9 & 9 & 9 & 9 \\ 8 & 8 & 8 & 8 & 9 & 9 & 9 & 9 \\ 8 & 8 & 8 & 8 & 9 & 9 & 9 & 9 \\ 8 & 8 & 8 & 8 & 9 & 9 & 9 & 9 \end{bmatrix}$$

$$\begin{bmatrix} \begin{bmatrix} 0a & 1a & 4a & 4a & 7a & 7a & 7a & 7a \\ 2a & 3a & 4a & 4a & 7a & 7a & 7a & 7a \\ 5a & 5a & 6a & 6a & 7a & 7a & 7a & 7a \\ 5a & 5a & 6a & 6a & 7a & 7a & 7a & 7a \\ 8a & 8a & 8a & 8a & 9a & 9a & 9a & 9a \\ 8a & 8a & 8a & 8a & 9a & 9a & 9a & 9a \\ 8a & 8a & 8a & 8a & 9a & 9a & 9a & 9a \\ 8a & 8a & 8a & 8a & 9a & 9a & 9a & 9a \end{bmatrix} & \begin{bmatrix} 0b & 1b & 4b & 4b & 7b & 7b & 7b & 7b \\ 2b & 3b & 4b & 4b & 7b & 7b & 7b & 7b \\ 5b & 5b & 6b & 6b & 7b & 7b & 7b & 7b \\ 5b & 5b & 6b & 6b & 7b & 7b & 7b & 7b \\ 8b & 8b & 8b & 8b & 9b & 9b & 9b & 9b \\ 8b & 8b & 8b & 8b & 9b & 9b & 9b & 9b \\ 8b & 8b & 8b & 8b & 9b & 9b & 9b & 9b \\ 8b & 8b & 8b & 8b & 9b & 9b & 9b & 9b \end{bmatrix} \\ \begin{bmatrix} 0c & 1c & 4c & 4c & 7c & 7c & 7c & 7c \\ 2c & 3c & 4c & 4c & 7c & 7c & 7c & 7c \\ 5c & 5c & 6c & 6c & 7c & 7c & 7c & 7c \\ 5c & 5c & 6c & 6c & 7c & 7c & 7c & 7c \\ 8c & 8c & 8c & 8c & 9c & 9c & 9c & 9c \\ 8c & 8c & 8c & 8c & 9c & 9c & 9c & 9c \\ 8c & 8c & 8c & 8c & 9c & 9c & 9c & 9c \\ 8c & 8c & 8c & 8c & 9c & 9c & 9c & 9c \end{bmatrix} & \begin{bmatrix} 0d & 1d & 4d & 4d & 7d & 7d & 7d & 7d \\ 2d & 3d & 4d & 4d & 7d & 7d & 7d & 7d \\ 5d & 5d & 6d & 6d & 7d & 7d & 7d & 7d \\ 5d & 5d & 6d & 6d & 7d & 7d & 7d & 7d \\ 8d & 8d & 8d & 8d & 9d & 9d & 9d & 9d \\ 8d & 8d & 8d & 8d & 9d & 9d & 9d & 9d \\ 8d & 8d & 8d & 8d & 9d & 9d & 9d & 9d \\ 8d & 8d & 8d & 8d & 9d & 9d & 9d & 9d \end{bmatrix} \end{bmatrix}$$

FIG. 6

$$\begin{bmatrix} 0a & 0b \\ 0c & 0d \end{bmatrix}$$

FIG. 7

$$\begin{bmatrix} 8a & 8a & 8a & 8a & 8b & 8b & 8b & 8b \\ 8a & 8a & 8a & 8a & 8b & 8b & 8b & 8b \\ 8a & 8a & 8a & 8a & 8b & 8b & 8b & 8b \\ 8a & 8a & 8a & 8a & 8b & 8b & 8b & 8b \\ 8c & 8c & 8c & 8c & 8d & 8d & 8d & 8d \\ 8c & 8c & 8c & 8c & 8d & 8d & 8d & 8d \\ 8c & 8c & 8c & 8c & 8d & 8d & 8d & 8d \\ 8c & 8c & 8c & 8c & 8d & 8d & 8d & 8d \end{bmatrix}$$

FIG. 8

$$\begin{bmatrix} \begin{bmatrix} 0a & 1a \\ 2a & 3a \end{bmatrix} & \begin{bmatrix} 0b & 1b \\ 2b & 3b \end{bmatrix} \\ \begin{bmatrix} 0c & 1c \\ 2c & 3c \end{bmatrix} & \begin{bmatrix} 0d & 1d \\ 2d & 3d \end{bmatrix} \end{bmatrix}$$

FIG. 14

METHOD AND APPARATUS FOR HIERARCHICALLY ENCODING AND DECODING AN IMAGE

FIELD OF INVENTION

The present invention relates to a method and apparatus for encoding and decoding digital images including transcoding to and from other compression formats. The present invention is not limited to still image technologies and may also be used in video image technologies.

BACKGROUND OF INVENTION

In the current baseline JPEG standard it is necessary to substantially decode all the transform coefficients of an 8×8 block before the next 8×8 block can be decoded. Thus the time required to decode any lower resolution version of the image is bound by the time to decode all the coefficients. This time actually significantly constrains the decoding time, especially for the smallest resolutions.

The JPEG standard also provides for redundant hierarchical encoding. The image is encoded at multiple resolutions so that lower resolution versions may be accessed without first having to decompress the image at its full resolution. However this results in large compression files which contain more information than is desirable.

The JPEG standard also provides for non redundant hierarchical encoding such as spectral selection. However these methods are inefficient in the coding of the image

SUMMARY OF INVENTION

It is an object of the invention to ameliorate one or more of the above mentioned disadvantages of the prior art.

According to a first aspect of the invention, there is provided an image encoding method comprising the steps of: (a) dividing an image into a plurality of blocks which are composed of (A×B) pixels, A and B being an integer two or more;(b) converting pixels into coefficients in plural frequency regions in the block basis; (c) combining the coefficients of the same frequency region in different blocks to obtain a group of coefficients; and (d) encoding the group of coefficients by the group.

According to a second aspect of the invention, there is provided a method of representing a digital image to provide a coded representation, said method comprising the steps of: (a) dividing said digital image into a plurality of blocks of pixels; (b) transforming each block of pixels into a block of transform coefficients, where each transform coefficient is represented by a predefined bit sequence; (c) rearranging the transform coefficients into a plurality of groups each having one or more subgroups of transform coefficients, wherein said transform coefficients of the same spatial frequency region are grouped together in the same group; (d) selecting in turn each subgroup as a region and setting a predetermined maximum bit plane as the current bit plane; (e) scanning the significance of each bitplane of said selected region from said current bitplane towards a predetermined minimum bitplane, and providing a first token for each insignificant bitplane and a second token for a significant bitplane in said coded representation until a significant bitplane is determined and setting said determined significant bitplane as the current bitplane; (f) partitioning said selected region into two or more subregions having a predetermined form, and setting each of said subregions as said selected region; and (g) repeating steps (e) and (f) for each selected region in turn, commencing from said current bit plane until the predetermined minimum bitplane has been reached, or said selected region has a predetermined size, and coding said transform coefficients of said selected region and providing said coded transform coefficients in said coded representation.

According to a third aspect of the invention, there is provided a method of encoding an image. The method includes the step of dividing the image into a plurality of blocks of pixels. The method also includes the step of transforming the blocks of pixels into respective blocks of transform coefficients, wherein each block of transform coefficients comprises a plurality of subgroups of transform coefficients. The subgroups of each block are associated with respective spatial frequency regions of the block and are capable of being hierarchically inverse transformed to reproduce a number of resolutions of a sub-image of the image. The method further includes the step of rearranging all the subgroups of transform coefficients from all the blocks into groups of transform coefficients, wherein each group comprises those subgroups associated with the same spatial frequency regions from all the blocks of transform coefficients. The method further includes the step of encoding the groups in turn beginning with a first group and continuing in sequence through to a last group, wherein each group is encoded such that a decoder is capable of decoding each group substantially independently of any other group.

According to a fourth aspect of the invention, there is provided a method for decoding a coded representation of a digital image, the coded representation comprising in turn a plurality of encoded groups of transform coefficients, commencing with a first group and continuing in sequence through to a last group. Each encoded group comprises subgroups of transform coefficients associated with the same spatial frequency regions from respective blocks of transform coefficients. The method includes the step of selecting a resolution mode. The method also includes the step of decoding the encoded groups in turn beginning with the first encoded group and continuing in sequence until a number of encoded groups have been decoded, wherein the number is an integer and is determined in response to the resolution mode. The method further includes the step of rearranging all of the transform coefficients of the decoded groups into a plurality of m×m complete blocks of the transform coefficients, where m is an integer and is dependent on the selected resolution mode. The method further includes the step of inverse transforming each of the m×m blocks of transform coefficients, if necessary, to derive a block of pixels. Also included is the step of combining the blocks of pixels to reconstitute the image at the selected resolution.

According to a fifth aspect of the invention, there is provided a method for decoding a coded representation of a digital image, said image comprises a plurality of blocks of pixels having associated therewith blocks of transform coefficients which have been rearranged into a plurality of groups each comprising one or more subgroups of transform coefficients, said method comprising the steps of: (a) selecting a resolution mode; (b) decoding the groups in turn beginning with a first group and continuing in sequence until a number of groups have been decoded, wherein said number is determined in response to said resolution mode; and wherein said decoding step comprises the following sub-steps (b)(i) selecting in turn each said subgroup of the groups to be decoded as a region; (b)(ii) scanning said coded representation associated with said selected region, said coded representation comprising a first token for each insignificant bitplane of said coefficients, a second token for each significant bitplane of said coefficients, and zero or more coded coefficients; (b)(iii) if a first token is determined, providing an insignificant bitplane in an output stream for a current bitplane of coefficients of said selected region; (b)(iv) if a second token is determined, providing a significant bitplane in said output stream for said current bitplane of said coefficients of said selected region and partitioning said selected region into two or more subregions having a predetermined form, and setting each of said subregions as said selected region; and (b)(v) repeating steps (b)(ii) to (b)(iv) commencing from a predetermined bitplane until a predetermined minimum bit plane has been reached, or until said selected region has a predetermined size wherein a coded transform coefficient of said selected region is decoded; and (b)(vi) providing said selected subgroups of decoded transform coefficients as an output; (c) rearranging all of the decoded transform coefficients of said selected subgroups into a plurality of n×n blocks of said transform coefficients, where n is an integer and is dependent on the selected resolution mode; (d) inverse transforming each of said n×n block of transform coefficients, if necessary, to derive a n×n block of pixels; and (e) combining said blocks of pixels to reconstitute the digital image or a resolution thereof.

According to a sixth aspect of the invention, there is provided a method of transcoding a JPEG encoded digital image to provide a coded representation in another format. The method includes the step of entropy decoding the JPEG digital image to generate blocks of transform coefficients, wherein each block of transform coefficients comprises a plurality of subgroups of transform coefficients, wherein the subgroups of each block are associated with respective spatial frequency regions of the block and are capable of being hierarchically inverse transformed to reproduce a number of resolutions of a sub-image of the image. The method also includes the step of rearranging all the subgroups of transform coefficients from all the blocks into groups of transform coefficients, wherein each group comprises those subgroups associated with the same spatial frequency regions from all the blocks of transform coefficients. The method further includes the step of encoding the groups in turn beginning with a first group and continuing in sequence through to a last group, wherein each group is encoded such that a decoder is capable of decoding each group substantially independently of any other group.

According to a seventh aspect of the invention, there is provided a method of transcoding a coded representation of a digital image to a JPEG encoded image, the coded representation comprising in turn a plurality of encoded groups of transform coefficients, commencing with a first group and continuing in sequence through to a last group. Each encoded group comprises subgroups of transform coefficients associated with the same spatial frequency regions from respective blocks of transform coefficients. The method includes the step of selecting a resolution mode. The method also includes the step of decoding the encoded groups in turn beginning with a first encoded group and continuing in sequence until a number of encoded groups have been decoded, wherein the number is an integer and is determined in response to the resolution mode. The method further includes the step of rearranging all of the transform coefficients of the decoded groups into a plurality of m×m complete blocks of the transform coefficients, where m is an integer and is dependent on the selected resolution mode. The method further includes the step of entropy encoding the m×m blocks of transform coefficients to form a JPEG digital image.

According to an eighth aspect of the invention, there is provided an image coding method comprising the steps of dividing an image into a plurality of blocks of pixels; transforming said blocks of pixels into respective blocks of transform coefficients in accordance with a two dimensional DCT transform, wherein each block of transform coefficients is an 8×8 block of coefficients having a DC transform coefficient and 63 AC transform coefficients; rearranging the transform coefficients into a plurality of groups, wherein a first said group comprises the DC coefficients, a second said group comprises AC01 AC10 and AC11 transform coefficients, a third said group comprises AC02, AC03, AC12, AC13, AC20, AC21, AC30, AC31, AC22, AC23, AC32, AC33 transform coefficients, a fourth said group comprises AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients, where ACij is the AC component at the ith row jth column of the block; encoding the groups of coefficients by group, wherein each group is encoded such that a decoder is capable of decoding each group substantially independently of any other group.

According to other aspects of the invention, there is provided apparatus for implementing any one of the aforementioned methods.

According to other aspects of the invention there is provided computer program products comprising a computer readable medium having recorded thereon a computer program for implementing any one of the methods described above.

BRIEF DESCRIPTION OF THE DRAWINGS

Embodiments of the invention are described with reference to the drawings, in which:

FIG. 6 illustrates four 8×8 discrete transform blocks of a 16×16 digital image as an example of the coefficient rearrangement process according to the preferred embodiment;

FIG. 7 illustrates the subband 0 formed from the transform coefficients in group 0 of the 16×16 digital image shown in FIG. 6;

FIG. 8 illustrates the subband 8 formed from the transform coefficients in group 8 of the 16×16 digital image shown in FIG. 6;

FIG. 14 illustrates the rearranged subbands 0, 1, 2, and 3 prior to dequantisation and transformation.

DETAILED DESCRIPTION

Overview

Figure 1:
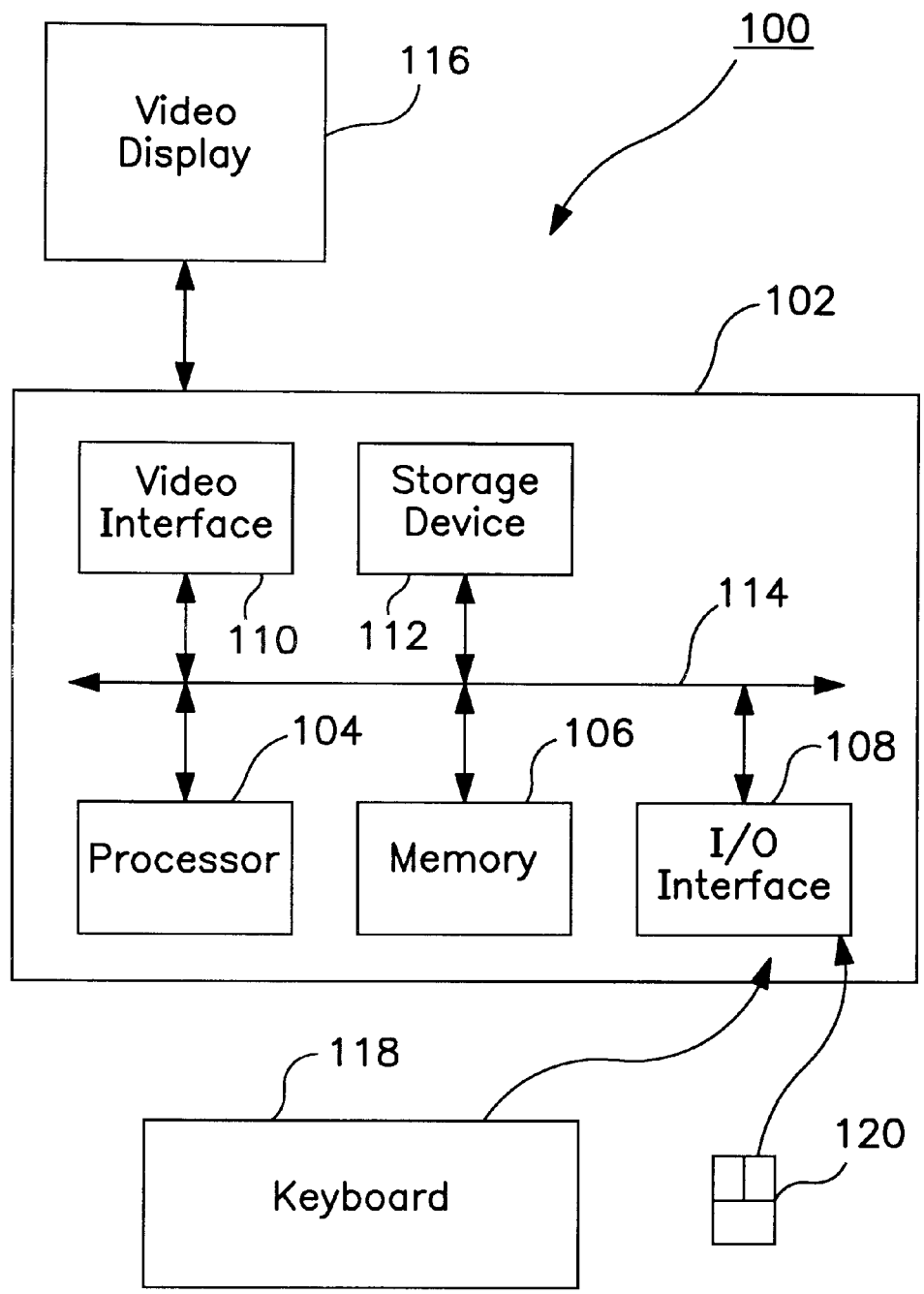
FIG. 1 is a block diagram of a general purpose computer with which the embodiments can be implemented.

The embodiments of the invention can preferably be practiced using a conventional general-purpose computer, such as the one shown in FIG. 1, wherein the processes of FIGS. 2 to 13D may be implemented as software executing on the computer. In particular, the steps of the coding and/or decoding methods are effected by instructions in the software that are carried out by the computer. The software may be stored in a computer readable medium, comprising the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention. A system may be practiced for coding a digital image and decoding the corresponding coded representation of the image, or vice versa.

The computer system 100 consists of the computer 102, a video display 116, and input devices 118, 120. In addition, the computer system 100 can have any of a number of other output devices including line printers, laser printers, plotters, and other reproduction devices connected to the computer 102. The computer system 100 can be connected to one or more other computers using an appropriate communication channel such as a modem communications path, a computer network, or the like. The computer network may include a local area network (LAN), a wide area network (WAN), an Intranet, and/or the Internet The computer 102 itself consists of a central processing unit(s) (simply referred to as a processor hereinafter) 104, a memory 106 which may include random access memory (RAM) and read-only memory (ROM), an input/output (I/O) interface 108, a video interface 110, and one or more storage devices generally represented by a block 112 in FIG. 1. The storage device(s) 112 can consist of one or more of the following: a floppy disc, a hard disc drive, a magneto-optical disc drive, CD-ROM, magnetic tape or any other of a number of non-volatile storage devices well known to those skilled in the art. Each of the components 104 to 112 is typically connected to one or more of the other devices via a bus 114 that in turn can consist of data, address, and control buses.

The video interface 110 is connected to the video display 116 and provides video signals from the computer 102 for display on the video display 116. User input to operate the computer 102 can be provided by one or more input devices. For example, an operator can use the keyboard 118 and/or a pointing device such as the mouse 120 to provide input to the computer 102.

The system 100 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 112 in FIG. 1) as the computer readable medium, and read and controlled using the processor 104. Intermediate storage of the program and pixel data and any data fetched from the network may be accomplished using the semiconductor memory 106, possibly in concert with the hard disk drive 112.

In some instances, the program may be supplied to the user encoded on a CD-ROM or a floppy disk (both generally depicted by block 112), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The embodiments of the invention may alternatively be implemented in dedicated hardware such as one or more integrated circuits performing the functions or subfunctions of the encoding, decoding or transcoding processes. Such dedicated hardware may in addition include one or more microprocessors and associated memories.

Figure 2:
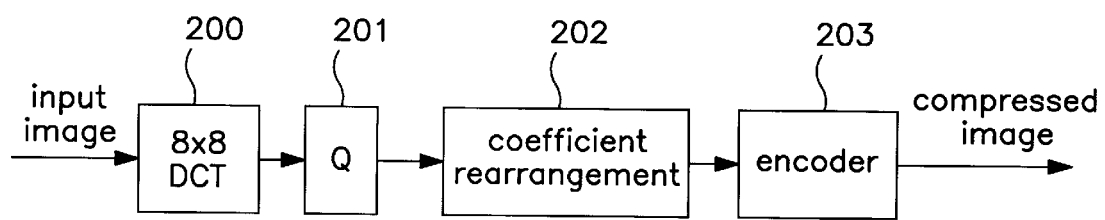
FIG. 2 is a flow diagram illustrating a method of encoding an image according to a preferred embodiment.

FIG. 2 shows a flow diagram of an encoding method for encoding a digital image to a compressed digital image in accordance with one embodiment of the invention. In this compression process, the original digital image is divided into 8×8 blocks of pixels, which blocks are then sequentially fed to the input of an 8×8 two dimensional discrete cosine transform (DCT) transformer 200. The transformer 200 generates 8×8 blocks of DCT coefficients, in the same manner as in the JPEG baseline standard. Each DCT coefficient is quantised by a quantiser 201 also according to the JPEG baseline standard. However, other alternative embodiments of quantisation may be practiced without departing from the scope and spirit of the invention. The quantised DCT coefficients of all the 8×8 blocks of the original image are then fed to a coefficient rearrangement device 202 where the quantised DCT coefficients are rearranged into a hierarchical format. In this hierarchical format, the coefficients are grouped together in a number of subbands. This process of rearranging the DCT coefficients in subbands is described in more detail in the section herein entitled "Coefficient Rearrangement Process of Preferred Embodiment". The subbands of coefficients are then coded in turn by the encoder 203 into a bitstream representing the digital image. The encoding process performed by the encoder is described in more detail in the section herein entitled "Encoding Process of Preferred Embodiment". Still further, entropy coding (e.g. binary arithmetic coding) may be optionally used in conjunction with the above mentioned encoding process. That is, the above-described encoding process may be followed by a step of entropy encoding the encoded stream. If so, the decoding step described below with reference to FIG. 3 may be preceded by an entropy decoding step for decoding the entropy coded stream. The encoding method shown in FIG. 2 is very similar to a JPEG baseline compression apparatus. However, the compression method described herein uses a fundamentally different rearrangement process and different encoding process.

Figure 3:
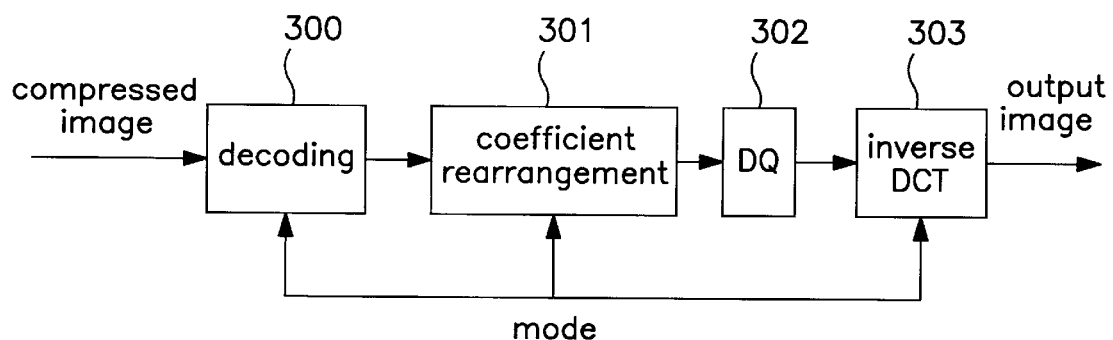
FIG. 3 is a flow diagram illustrating a method of decoding an image according to a preferred embodiment.

FIG. 3 shows a flow diagram of the decoding method of a compressed digital image to the original digital image, where the compressed digital image has been encoded by the encoding method shown in FIG. 2. The encoded bitstream is fed to a decoder 300, which decodes the bitstream to generate a number of subbands arranged in a hierarchical format. The decoding process of the decoder 300 is described in more detail in the section herein entitled "Decoding Process of Preferred Embodiment". These subbands are fed one after another to a coefficient rearrangement device 301 which is adapted to select and rearrange one or more of the subbands to generate n×n blocks of DCT coefficients. The n×n blocks of quantised DCT coefficients are then fed to a dequantiser 302, where each coefficient is then dequantised in a similar manner to the JPEG baseline standard. However, other alternative embodiments of dequantisation may be practised without departing from the scope and spirit of the invention. Finally each n×n block of coefficients is transformed with an inverse n×n two dimensional DCT encoder 302 and the resulting image blocks are combined to reconstitute the original image, or some approximation thereof.

The decoding method shown in FIG. 3 is able to operate in a number of different resolution modes in response to user input. The decoder 300 in response to user input decodes a predetermined number of subbands of coefficients and feeds these subbands to the coefficient device 301. The coefficient rearrangement device 301 rearranges these subbands of coefficients in a particular manner dependent upon the desired resolution mode and feeds these coefficients via the quantiser to the inverse DCT transformer 303. The inverse DCT transformer 303 performs an n×n inverse DCT transform, where n is dependent upon the desired mode of resolution and can equal 8, 4, 2 or 0. However, other modes of resolutions and sizes of transforms are possible.

The 2 Dimensional Discrete Cosine Transform (DCT)

Figures 4, 5:
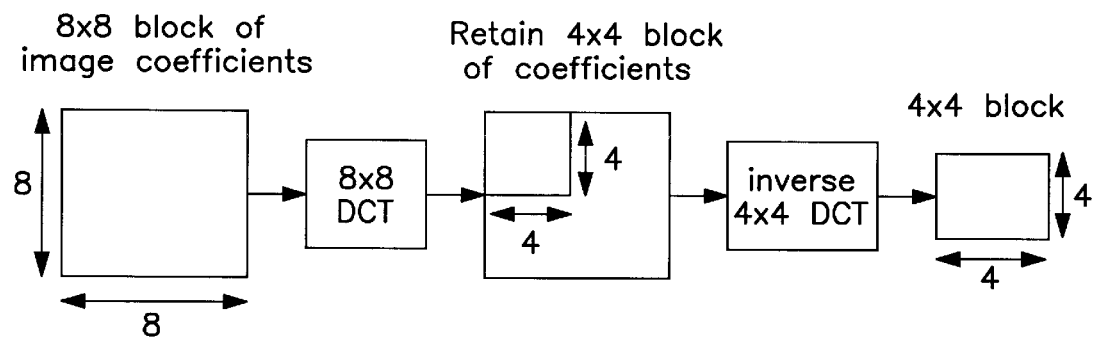
FIG. 4 is a flow diagram illustrating a method of decoding an image utilising a reduced inverse discrete cosine transform according to a preferred embodiment.
FIG. 5 illustrates the grouping of discrete transform coefficients within an 8×8 discrete cosine transform block according to a preferred embodiment.

In the encoding method described herein (FIG. 2), each 8×8 block of the input image is transformed using a two dimensional discrete cosine transform (200), generating an 8×8 block of transform coefficients. Similarly in the decoding method described herein (FIG. 3), transforming the 8×8 block of transform coefficients with a two dimensional inverse discrete cosine transform (302) gives the original 8×8 block (i.e. n=8). A lower resolution version of the block may be obtained using a lower order inverse DCT. For example, as illustrated in FIG. 4, the top left 4×4 quadrant of the 8×8 block of transform coefficients may be transformed with a 4×4 two-dimensional inverse DCT (i.e. n=4). The resulting 4×4 array of coefficients is a lower resolution version of the original 8×8 block. In the same manner an inverse 2×2 inverse DCT can be used to give a 2×2 array of coefficients that is a lower (again) resolution version of the block (i.e. n=2). Finally the DC coefficient itself, being the (scaled) average of the 8×8 block, can be used as the coarsest approximation to the block (i.e. n=0).

This approach is be used to hierarchically decode images coded with an 8×8 DCT. For example, to decode an image that is 2 times as small as the original in each dimension, only the 4×4 lowest frequency coefficients of each 8×8 transform block need be decoded and inverse quantised. Each such 4×4 block is then transformed with an inverse two-dimensional 4×4 DCT. In the latter instance, scaling would normally be required. To decode an image that is 4 times as small in each dimension, only the 2×2 lowest frequency coefficients need to be decoded and transformed appropriately. Again, scaling may be required. Finally the DC coefficient of each block can be used to form an image that is 8 times smaller than the original in each dimension. In this case no inverse DCT is required, other than scaling.

Coefficient Rearrangment Process of the Preferred Embodiment

In this embodiment, all the transform coefficients of the image are rearranged whereby all the DC coefficients are coded into the compressed bit stream first, then all the AC coefficients roughly in order of increasing frequency. In this way, for a given resolution, the required coefficients are contained in the first part of the bit stream and it is unnecessary to decode unwanted coefficients.

Preferably the decoding process can decode images that are a power of 2 times smaller than the original image in each dimension. That is 2, 4 and 8 times smaller in each dimension. For many applications this an acceptable constraint.

The rearrangement of coefficients is described with reference to FIG. 5 and FIG. 6. In FIG. 5, the coefficients of each 8×8 block, arranged in the usual order of increasing spatial frequency components, are labelled as four groups of 10 subgroups. The first group consists of subgroup 0 only. The second group consists of subgroups 1 to 3, the third group consists of subgroups 4 to 6, and the fourth group consists of subgroups 7 to 9. The DC coefficient is subgroup 0. The coefficient situated in row 0 and column 1 of the 8×8 matrix, (where the row/column numbering begins from 0), is in subgroup 1. The coefficient situated in row 1 column 0 is in subgroup 2. The coefficient in column 1 row 1 is in subgroup 3. The coefficients in row 0 column 2, row 0 column 3, row 1 column 2, row 1 column 3 are in subgroup 4 and so on. In FIG. 6, each 8×8 block of a 16×16 image has been transformed with a two-dimensional DCT. Each coefficient has been labelled according to the above grouping shown in FIG. 5. The labels a, b, c, and d are used to delineate the separate 8×8 blocks. The rearrangement forms "subbands" (looseley speaking) from the subgroups of coefficients. There are then 10 subbands labelled 0–9. For example subband 0 is formed from the coefficients as shown in FIG. 7 while subband 8 is formed as illustrated in FIG. 8.

In a further embodiment, the method re-arranges the transform coefficients in four subbands (instead of ten) comprising, a first subband consisting of the subgroup 0 of the 8×8 blocks, a second subband consisting of the subgroups 1 to 3 of the 8×8 blocks, a third subband consisting of subgroups 4 to 6 of the 8×8 blocks, and a fourth subband consisting of subgroups 7 to 9 of the 8×8 blocks. Specifically, each 8×8 block of transform coefficients comprises a DC transform coefficient and 63 AC transform coefficients, and the rearranging step combines the DC coefficients into the first subband, the AC01, AC10, and AC11 transform coefficients in the second subband, the AC02, AC03 AC12 , AC13, AC20, AC21, AC30, AC31, AC22, AC23, AC32, AC33 transform coefficients in the third subband, the AC04, AC05, AC06, AC07, AC14, AC15, AC16, AC17, AC24, AC25, AC26, AC27, AC34, AC35, AC36, AC37, AC40, AC50, AC60, AC70, AC41, AC51 ,AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth subband, where ACij is the AC component at the ith row jth column of the block.

For images that are larger than 16×16 pixels in size there will still be 10 subbands, but each subband will be proportionately larger. In this way, all the transform coefficients of an image can be arranged in subbands 0 to 9.

Encoding Process of the Subbands of the Preferred Embodiment

For discrete cosine transform coding applications, the number of bits per coefficient required to represent the possible range of coefficients is determined by the resolution of each pixel (in bits per pixel) in the input image. This range of values for each pixel is typically large relative to the values of most of the transform coefficients, and thus many coefficients have a large number of leading zeros. For example, the number 9 has four leading zeros in an 8-bit representation and has 12 leading zeros in a 16-bit representation. The encoding method and apparatus in accordance with the present embodiment provide a way of representing (or coding) these leading zeros, for blocks of coefficients, in an efficient manner. The remaining bits and sign of the number may be encoded directly without modification.

To simplify the description and not to obscure unnecessarily the invention, the discrete cosine transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value. Thus, for the purpose of compression, any information contained in fractional bits is normally ignored.

Before proceeding with a further description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. A transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three dimensional space which passes through each bit sequence at the same bitnumber is called a bitplane.

Figure 9:
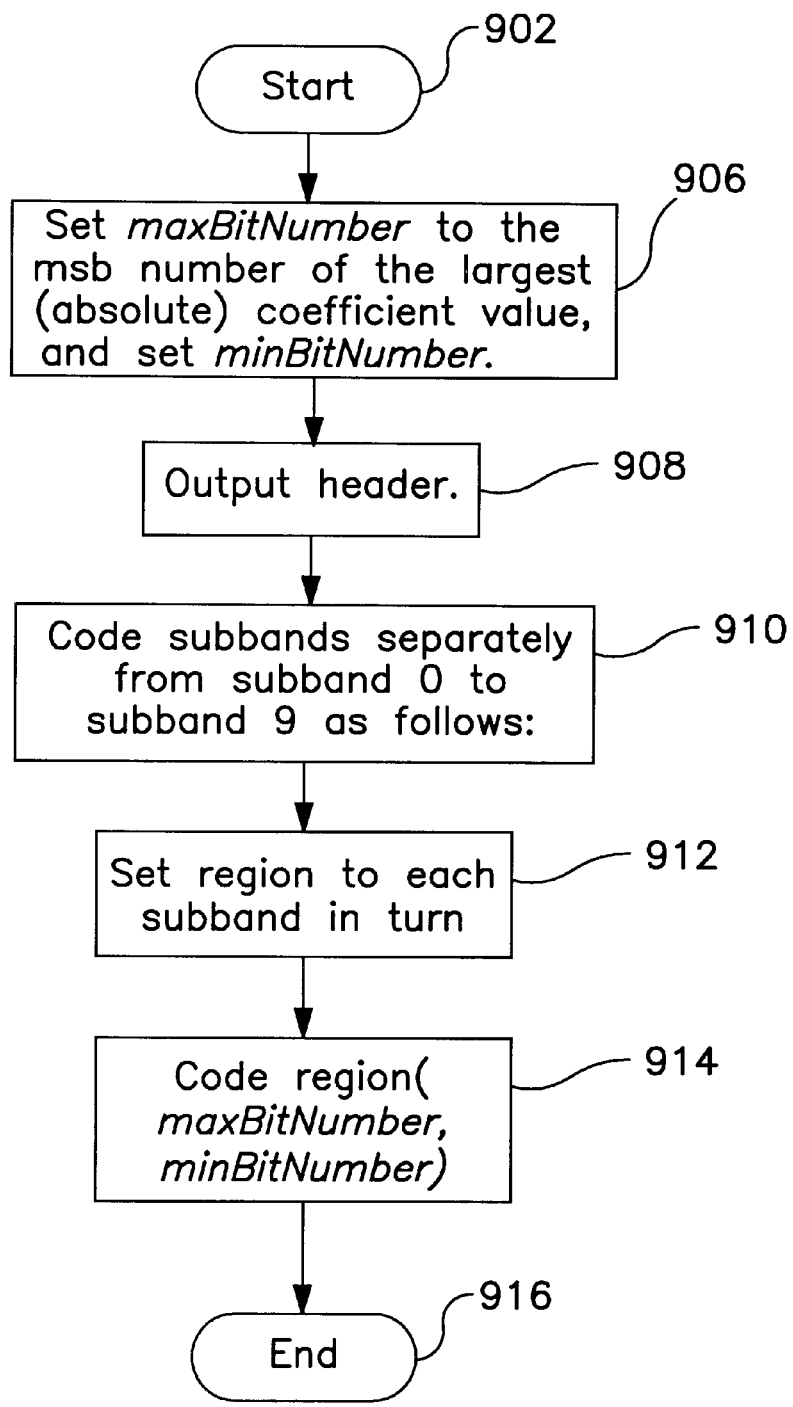
FIG. 9 is a flow diagram illustrating a method of encoding subbands utilised in the encoder shown in FIG. 2 of the preferred embodiment.

FIG. 9 is a flow diagram illustrating the image encoding method according to the preferred embodiment. In step 902, processing commences using the subbands of rearranged coefficients.

In step 906, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients. Each subband of the image is processed separately, setting each initial region to the whole subband in question.

Further, in step 906, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 908 which provides an output header in the coded representation of the input image. Thus, in a practical implementation, header information is output as part of the coded representation. For example, the output header of the embodiment of the invention may contain information about the source image, including the image height and width, the mean value of the DC subband, the maxBitNumber parameter, and the minBitNumber parameter.

Beginning in step 910, each subband of the transformed image is coded separately in steps 912 and 914. Each subband is coded independently, in order: that is, from subband 0 is first coded into the bitstream, then subband 1, subband 2 and so on. For the DC subband, the mean value is removed prior to coding and coded into the header information in step 908. In step 912, each subband is coded by setting an initial region as the whole subband. In step 914, the region is encoded with the maxBitNumber and minBitNumber as parameters. This provides a hierarchical code, since lower resolution versions of the image are coded into the bit stream before higher resolutions. Processing terminates in step 916.

Figure 10:
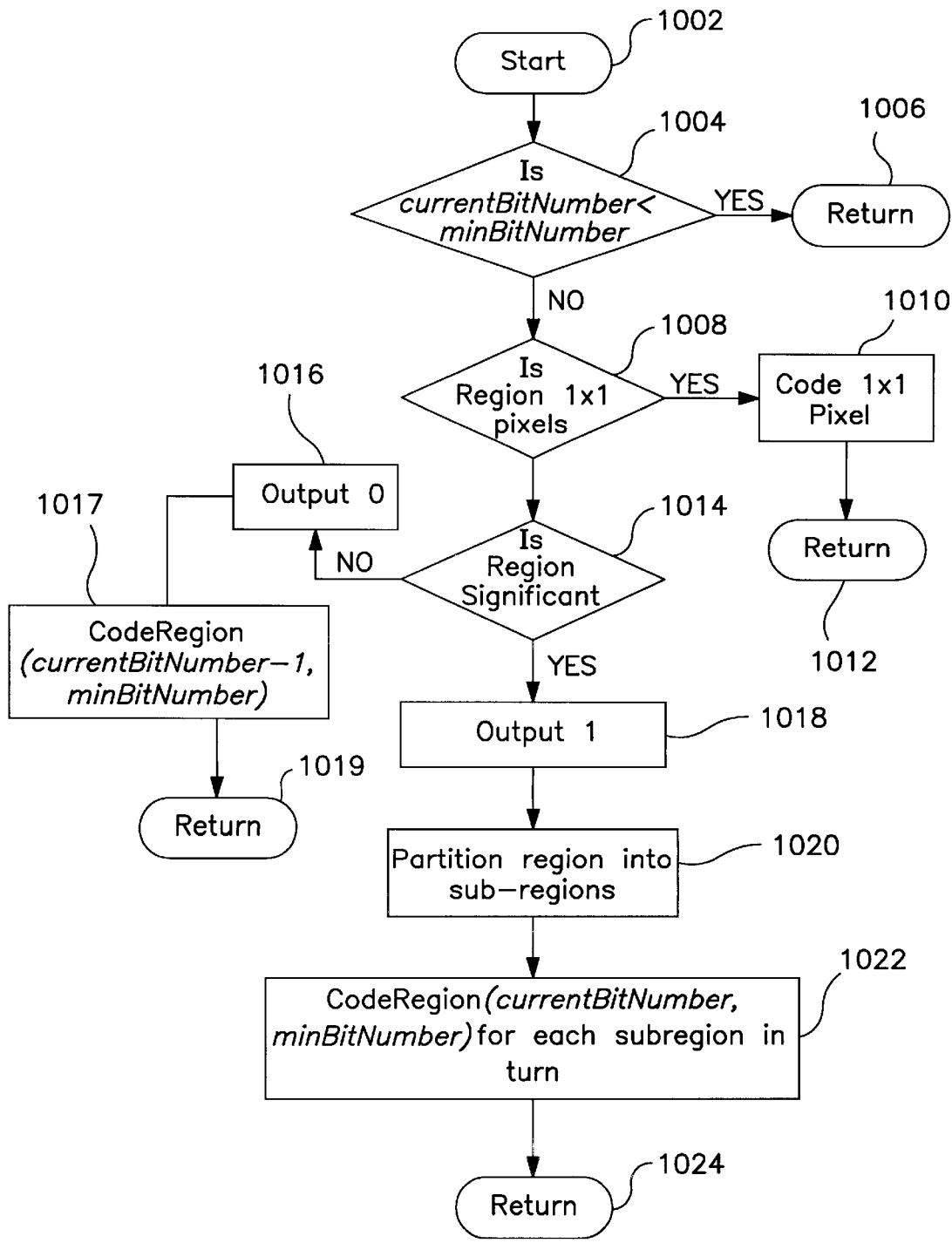
FIG. 10 is a flow diagram illustrating in more detail the encoding method shown in FIG. 9 of the preferred embodiment.

FIG. 10 is a detailed flow diagram of the procedure "CodeRegion (currentBitNumber, minBitNumber)" called in step 914 of FIG. 9 for coding each region, where maxBitNumber is provided as the currentBitNumber. In step 1002, processing commences. The inputs to the region coding process of FIG. 10 include the currentBitNumber and minBitNumber parameters. Preferably, the method is implemented as a recursive technique where the process is able to call itself with a selected region or sub-region. However, the process may implemented in a non-recursive manner without departing from the scope and spirit of the invention.

In decision block 1004, a check is made to determine if the currentBitNumber parameter is less than the minBitNumber parameter. If decision block 1004 returns true (yes), nothing is done and processing returns to the calling procedure (or parent process) in step 1006. This condition indicates that every coefficient in the selected region has a msb number less than minBitNumber. Otherwise, if decision block 1004 returns false (no), processing continues at decision block 1008.

In decision block 1008, a check is made to determine if the selected region is a 1×1 pixel. While this embodiment is described with a predetermined size of 1×1 pixels, it will be apparent to one skilled in the art that different sizes may be practised without departing from the scope and spirit of the invention. The predetermined size can be M×N pixels, where both M and N are positive integers. For example, the predetermined size may be less than or equal to 2×2 pixels or coefficients. If decision block 1008 returns true (yes), processing continues at step 1010. In step 1010, the 1×1 pixel is coded. Again, it will be apparent to one skilled in the art that different predetermined sizes (M×N pixels) may be practiced. Still further, the predetermined size may be less than or equal to 2×2 pixels or coefficients. Preferably, this step 1010 involves directly outputting the remaining bits above the minBitNumber in the coded representation. In step 1012, processing returns to the calling procedure. Otherwise, if decision block 1008 returns false (no), the region consists of more than one coefficient and processing continues at decision block 1014

In decision block 1014, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in T_m, \quad (1)$$

where $T_m$ denotes the region, and $c_{ij}$ denotes coefficient (i,j) in this region.

If decision block 1014 returns false (no), processing continues at step 1016. In step 1016, a value of 0 (or first token) is output in the coded representation stream, and a recursive call is made in step 1017 to the subroutine CodeRegion(currentBitNumber−1, minBitNumber) where currentBitNumber has been decremented by 1 That is, the next, lower bitplane of the region is selected for processing. Processing then continues at decision block 1004, where the region is again processed with the parameters currentBitNumber−1 and minBitNumber. Otherwise, if decision block 1014 returns true (yes), that is, the region is significant, processing continues at step 1018. Alternatively, to reduce the number of recursive function calls, the step 1014 may be replace by a step that outputs currentBitNumber−n zeros, where n is the largest integer for which the region is significant. If n is not less than minBitNumber, the processing goes to step 718. Otherwise the function terminates.

In step 1018, a value of 1 (or second token) is output in the coded representation stream. In step 1020, the selected region is partitioned into a predetermined number (preferably, 4) of subregions using a specified partitioning algorithm or process. The partitioning process used is known to the decoder.

In step 1022, each subregion is then coded with the same currentBitNumber and minBitNumber parameters. This is preferably done by means of a recursive call to the procedure "CodeRegion(currentBitNumber, minBitNumber)" of FIG. 10. This coding of subregions may be implemented in parallel or sequentially. In the latter case, the processing commences from lower frequency subregions to higher frequency subregions in turn, i.e. subregion 0 to subregion 3.

In the coded representation, a transform coefficient is coded by simply outputting the pixel bits from the currentBitNumber to the minBitNumber. Preferably, a convention is followed whereby the sign is output only if some of the coefficient bits are non-zero. For example, if currentBitNumber=3, minBitNumber=1, then −9 (00001001) is coded as "1 0 0" followed by a sign bit "1".

Optionally, the encoding process of the preferred embodiment (as well as those of the other embodiments) may be implemented using a simple form of quantisation that can be effected by scaling (dividing) data by some scale factor prior to encoding. The decoding process, described below, can likewise be followed by a step of inverse scaling, if the scaling step is employed as part of the relevant encoding process.

Still further, entropy coding (e.g. binary arithmetic coding) may be optionally used in conjunction with the encoding processes of the embodiments of the invention. That is, the above-described encoding process may be followed by a step of entropy encoding the encoded stream. If so, the decoding step described below may be preceded by an entropy decoding step for decoding the entropy coded stream.

Two-Dimensional Example of the Encoding Process

The method effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient in certain situations, namely for coding discrete wavelet transform image coefficients, which typically exhibit a large dynamic range. A few coefficients typically have very large values, while most have very small values.

Figures 11A, 11B, 11C, 11D:
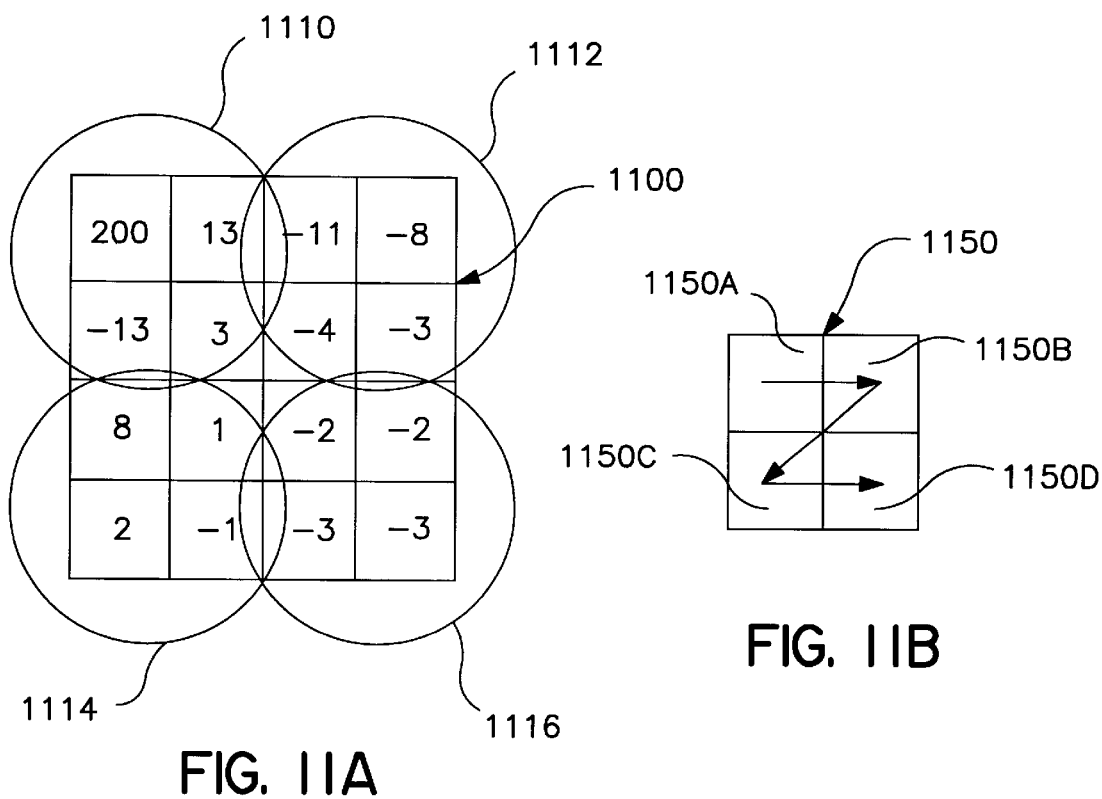
FIGS. 11A to 11D are diagrams illustrating the process of a 16 coefficient subband region in accordance with the embodiment methods of FIGS. 9 and 10.

An example of encoding a subband comprising 4×4 coefficients is described with reference to FIGS. 11A to 11D. The processing of the 4×4 region 1100 of FIG. 11A is commenced with the minBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 1100 then follows.

At currentBitNumber=7, a one (1) is output since the region 1100 is significant with respect to bit number 7 (see decision block 1004, 1008, and 1014 and step 1018 of FIG. 10). The region 1100 is then partitioned into four subregions (see step 1020 of FIG. 10): the top left region 1110, the top right region 1112, the bottom left region 1114 and the bottom right region 1116 of FIG. 11A. Each of the subregions consist of 2×2 coefficients.

The sub-regions 1110, 1112, 1114 and 1116 of FIG. 11A are in turn coded in the predefined processing sequence shown of FIG. 11B, where a region 1150 consists of four sub-regions 1150A to 1150D. The three arrows illustrated in the diagram indicate the order or sequence of processing, that is, top left sub-region 1150A, top right sub-region 1150B, bottom left sub-region 1150C and bottom right sub-region 1150D, respectively.

The sub-region 1110 of FIG. 11A is coded first (see step 1022 of FIG. 10). For the currentBitNumber equal to 7, a one (1) is output in the coded representation. The sub-region 1110 is then partitioned into four 1×1 pixels having decimal values 200, 13, −13 and 3. Each of these coefficients is coded by outputting the bits of each coefficient from the currentBitNumber=7 to the minBitNumber=3 (see decision block 1008 and step 1010 of FIG. 10). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficient "200" between the currentBitNumber and minBitNumber. This completes the coding of the top left sub-region 1110. The coded output at this stage is:

sign bit
111001 0 00001000001100000.
200        13   −13   3

The header information is not shown in the foregoing expression.

The top right sub-region 1112 is then coded (per FIG. 11B). A zero (0) is output for each of currentBitNumber equal to 7, 6, 5, and 4, since the region 1112 is insignificant with respect to these bit numbers. A one (1) is output at currentBitNumber=3, since this bitplane is significant with respect to bit number 3. The sub-region 1112 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

111100100000 100000110000000000 1 11 11 0 0
                                                                         −11 −8 −4 −3

The bottom left sub-region 1114 is then encoded. A zero (0) is output for each of currentBitNumber equal to 7, 6, 5, and 4, since the region 1114 is insignificant with respect to these bit numbers. A one (1) is output at currentBitNumber equal to 3, since this bitplane is significant with respect to bit number 3. The sub-region 1114 is then partitioned into four 1×1 pixels having values 8, 1, 2 and −1. These are coded respectively as binary value 1 with sign bit 0, and binary values 0, 0 and 0 without sign bits.

Finally, the bottom right sub-region 1116 having values −2, −2, −3, and −3 is coded. A zero (0) is output for each of currentBitNumber=7, 6, 5, 4 and 3 since the sub-region 1116 is insignificant with respect to these bit numbers. No sign bits are output. Thus, the coded representation is as follows:

1111001000001000001100000000011111000000110000000000

The decoder simply mimics the encoding process to reconstruct the region from the coded representation as depicted in FIG. 11C.

The decoding process can be made "smarter" in a number of ways. One such "smarter" way is depicted in FIG. 11D. In this case, the magnitude of each of the non-zero coefficients is increased by half of 2 to the power of minBitNumber. This is depicted in FIG. 11D. In this manner, the "smart" decoding processing generally reduces the mean square error between the decoded and the original coefficients. Still further, the encoder can alternatively perform this (type of) operation, thereby leaving the decoder to use the simplest depicted in FIG. 11C.

Hierarchical Decoding Process of the Preferred Embodiment

In the present embodiment, only subband 0, contained in the first portion of the coded bit stream, need be decoded in order to decompress an image 8 times smaller that the original image in each dimension, To decompress an image 4 times smaller in each dimension only subbands 0, 1, 2 and 3 need be decoded. These latter subbands can then be rearranged by the rearrangement device 301 into 2×2 DCT blocks, reversing the rearrangement performed during compression, for the (2×2) relevant coefficients. For the 16×16 image example, the subbands 0, 1, 2 and 3 are rearranged as shown in FIG. 14. Each 2×2 block is then dequantised and transformed with an inverse two-dimensional 2×2 DCT. Again these subbands are contained in the first portion of the bit stream so no unnecessary decoding is required. Finally to decompress an image 2 times smaller in each dimension subbands 0–6 can be decoded, rearranged and each 4×4 block dequantised and inverse transformed. For a full decoding all the subbands need to be decoded, rearranged into 8×8 blocks and each 8×8 block dequantised and inverse transformed. In this way, the decoder 300 will decode and output only subbands 0, 0 to 3, 0 to 6, or 0 to 9 dependent upon the desired resolution modes ⅛, ¼, ½, or full respectively. The rearrangement device 301 will then rearrange the subbands dependent upon the mode of resolution and the transformer 303 will perform the appropriate n×n inverse DCT transform (where n=0,2,4, or 8) again dependent upon the mode of resolution.

Figure 12:
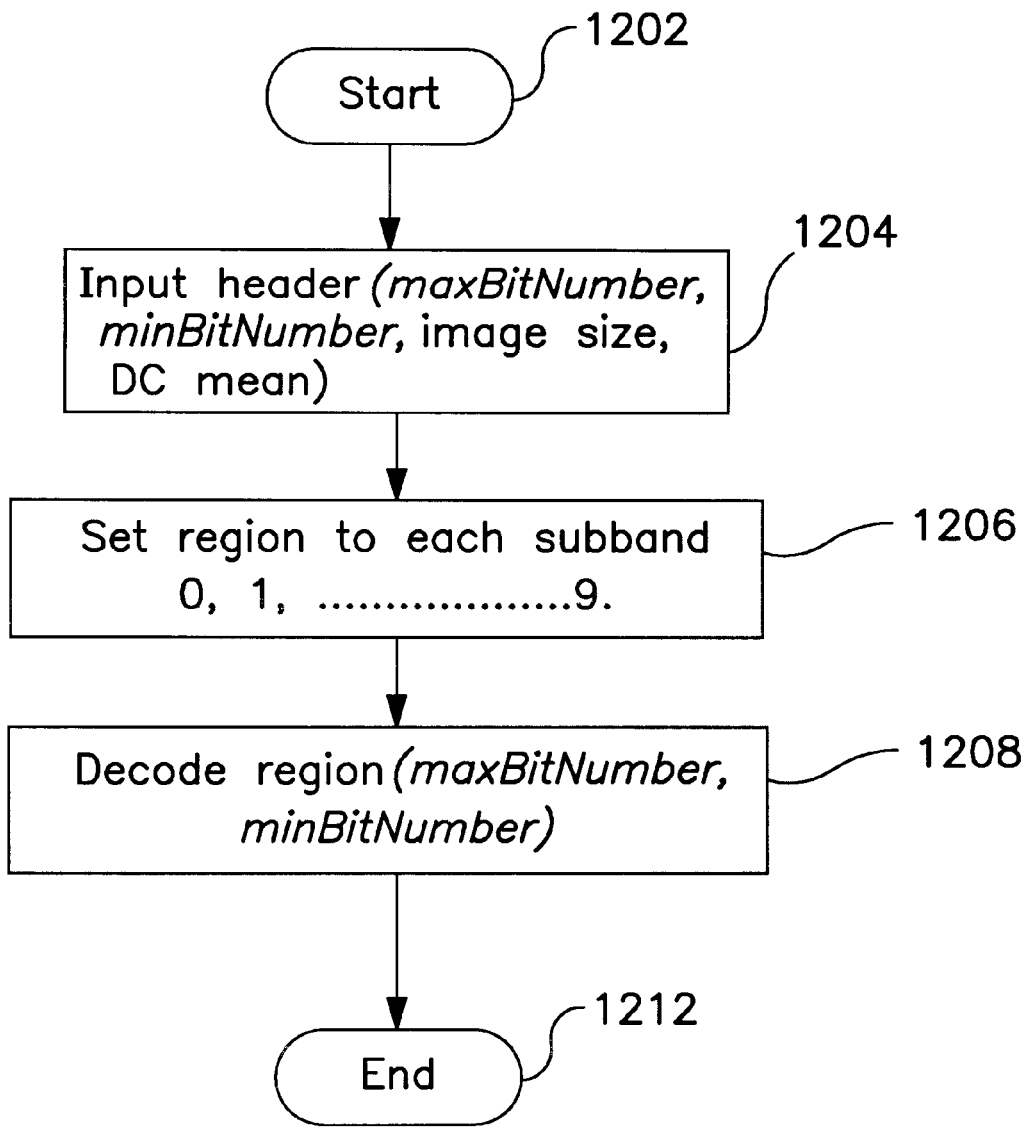
FIG. 12 is a flow diagram illustrating a method of hierarchical decoding utilised in the decoder method shown in FIG. 3 of the preferred embodiment.

FIG. 12 is a flow diagram illustrating the method of decoding the coded representation of an image performed by the decoder 300 shown in FIG. 3. In step 1202, processing commences using the coded representation of an image obtained using the processes of FIGS. 2, 9 and 10. In step 1204, the header information is read from the coded representation to determine the size of the original image. Also, information such as maxBitNumber (equal to the initial currentBitNumber in the coding process) and minBitNumber are input. Further information includes the mean value of the DC subband.

In step 1206, decoding of the relevant subbands for the selected resolution mode is commenced. Decoding is commenced by setting the region to the relevant subbands. In step 1208, the selected region is decoded using the maxBitNumber and minBitNumber parameters. Processing terminates in step 1212.

Figure 13:
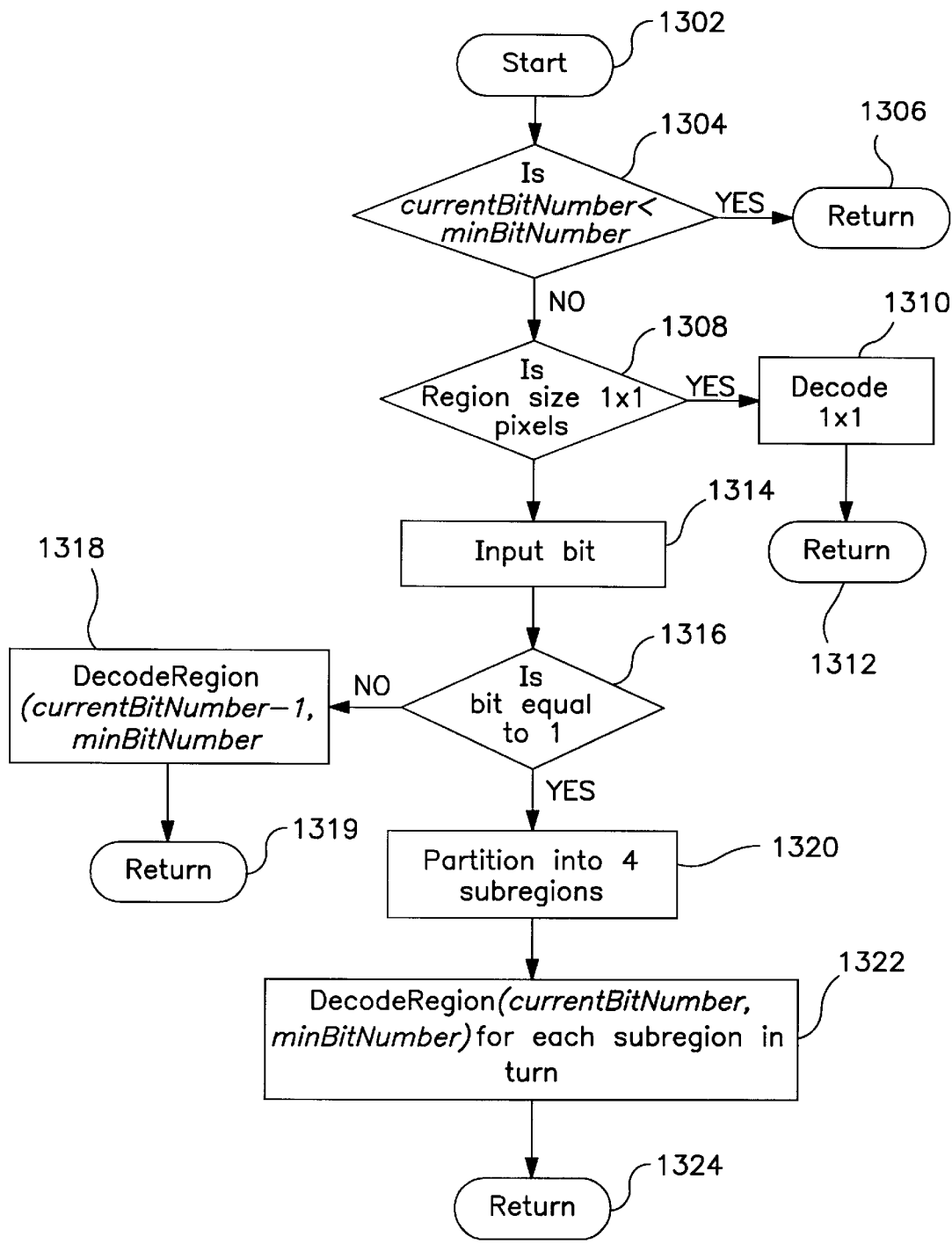
FIG. 13 is a flow diagram illustrating in more detail the decoding method shown in FIG. 12 of the preferred embodiment.

FIG. 13 is a detailed flow diagram of step 1208 of FIG. 12 for decoding each region using procedure call "Decode region (currentBitNumber, minBitNumber)", where maxBitNumber is provided as the currentBitNumber. In step 1302, processing commences. The inputs to the region decoding process of FIG. 13 are the currentBitNumber and minBitNumber parameters. Again, the method is preferably implemented as a recursive technique. However, the process may be implemented in a non-recursive manner without departing from the scope and spirit of the invention.

In decision block 1304, a check is made to determine if the currentBitNumber is less than the minBitNumber. If decision block 1304 returns true (yes), processing continues at step 1306, where processing returns to the calling procedure. Otherwise, if decision block 1304 returns false (no), processing continues at decision block 1308.

In decision block 1308, a check is made to determine if the selected region has a size of 1×1 pixels. If decision block 1308 returns true (yes), processing continues at step 1310. In step 1310, the 1×1 region is decoded. Likewise, the size may be predetermined and be equal to M×N pixels, where both M and N are positive integers. For example, the size may be less than or equal to 2×2 pixels or coefficients. Processing then returns to the calling procedure in step 1312. If decision block 1308 returns false (no), processing continues at step 1314. In step 1314, a bit is input from the coded representation.

In decision block 1316, a check is made to determine if the bit is equal to 1, that is, the input is checked to determine if the region is significant. If decision block 1316 returns false (no), processing continues at step 1318. In step 1318, a recursive call is made to DecodeRegion( ) with its currentBitNumber decremented by one, after which the processing returns to the calling procedure in step 1319. Otherwise, if decision block 1316 returns true (yes), processing continues at step 1320. In step 1320, the region is partitioned into the predetermined number (preferably, 4) of sub-regions. In step 1322, each of the sub-regions is decoded using the currentBitNumber and minBitNumber. In the preferred embodiment, this is carried out by means of a recursive call to the process illustrated in FIG. 13. In step 1324, processing returns to the calling procedure.

Thus, the bits output from the significance decisions in the encoder instruct the decoder on which path of the process to take, thus mimicking the encoder. The pixels, and possible sign, are decoded by simply reading in the appropriate number of bits (currentBitNumber to minBitNumber and if some of these are non-zero the sign bit).

Transcoding to JPEG

The hierarchical method disclosed here differs from the JPEG method only in the (re) arrangement of the quantised transform coefficients and the coding method of these quantised coefficients. The rearrangement of coefficients is invertible or lossless: that it is, rearranging the coefficients followed by a reverse rearrangement brings it back to where it started. Further, the coding processes of quantised coefficients in both JPEG and hierarchical coding method are lossless. Hence it is possible to transcode between JPEG and the said hierarchical method and back without loss.

For example to transcode from a JPEG compressed image to the said hierarchical format, a JPEG image can be partially decompressed (i.e. entropy decoded) to give 8×8 blocks of quantised DCT transform coefficients. These coefficients can then be arranged and coded according to the method disclosed here, to give the hierarchical compressed format. To transcode back to JPEG, the hierarchically coded image subbands are partially decoded, and the subbands are arranged into 8×8 blocks of quantised DCT transform coefficients. These can then be coded with the JPEG quantisation index coding method. The output JPEG compressed file will then be identical to the original JPEG file (assuming the header and auxiliary information remains the same).

In the same manner an image originally compressed with the disclosed hierarchical format can be transcoded to a JPEG format and back without loss.

Further Hierarchical Decoding

As the method has been described so far it is possible to decode a hierarchically compressed image at 2, 4 and 8 times smaller than the original in each dimension. This can be extended to 16, 32 . . . etc times smaller than the original image without losing the lossless transcoding to and from JPEG. This is achieved by coding subband 0 with a hierarchical lossless format. Being lossless we can decode subband 0 to exactly what we started with. For example, it is possible to use a lossless hierarchical encoding method on the subband 0 similar to that described with reference to FIG. 9. In this variant method an integer wavelet transform step is performed on the subband 0 between steps 902 and 906 and the subband 0 is broken up into further subbands which are coded separately in step 910. By decoding lower resolution versions of subband 0 we obtain lower resolution versions of the original image. (In this case it is desirable to undo the DPCM of the DC coefficients prior to subband 0 coding).

The embodiments of the invention provide methods and apparatuses for representing digital image data in an efficient and flexible manner, in which the representation is suitable for storing and/or transmitting images. The encoding techniques can be used generally to represent an array of transform coefficients, and to provide an efficient representation by representing an image in the discrete cosine transform domain. In particular, the embodiments provide methods and apparatuses for representing (or coding) leading zeros of blocks of transform coefficients obtained from an input image. The techniques are efficient in terms of offering a good reproduction of the original image for a given size code and offering fast hierarchical decoding. Further, the techniques are flexible in that coefficients obtained from a linear transformation are encoded independently without the use of entropy coding. The advantageous aspects of the embodiment include the quantisation nature of the coding and the ability to transcode to JPEG without loss.

The embodiments of the present invention are not restricted to the use of a DCT (Discrete Cosine Transformation), but may use another linear transformation, such as DWT (Discrete Wavelet Transformation). In addition, the invention need not be limited to re-arranging all of the transform coefficients of the digital image but can include re-arranging all the transform coefficients of a part of the digital image.

The foregoing only describes a small number of embodiments of the present invention, however, modifications and/or changes can be made thereto without departing from the scope and spirit of the invention.

What is claimed is:

1. An image coding method comprising the steps of dividing an image into a plurality of blocks of pixels;

transforming the blocks of pixels into respective blocks of transform coefficients in accordance with a two-dimensional DCT transform, wherein each block of transform coefficients is a 8×8 block of coefficients having a DC transform coefficient and 63 AC transform coefficients;

rearranging the transform coefficients into a plurality of groups, wherein a first group comprises the DC coefficients, a second group comprises AC01, AC10, and AC11 transform coefficients, a third group comprises AC02, AC03, AC12, AC13, AC20, AC21, AC30, AC31, AC22, AC23, AC32, and AC33 transform coefficients, a fourth group comprises AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients, where ACij is the AC component at the ith row and jth column of the block; and encoding the groups of coefficients by group, wherein each group is encoded such that a decoder is capable of decoding each group substantially independently of any other group.

2. A method as claimed in claim 1, wherein said rearranging step includes rearranging the groups into one or more sub-groups of transform coefficients.

3. A method as claimed in claim 2, wherein said rearranging step includes rearranging each of the groups other than the first group into three subgroups.

4. A method as claimed in claim 3, wherein said transforming step comprises the step of:

transforming each block of pixels into a block of transform coefficients, where each transform coefficient is represented by a predefined bit sequence.

5. A method as claimed in claim 4, wherein said encoding step comprises the steps of:

selecting in turn each subgroup as a region and setting a predetermined maximum bit plane as the current bit plane;

scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

partitioning the selected region into two or more subregions having a predetermined form, and setting each of the subregions as the selected region; and repeating the scanning and partitioning steps for each selected region in turn, commencing from the current bitplane until the predetermined minimum bitplane has been reached, or the selected region has a predetermined size, and coding the transform coefficients of the selected region.

6. A method of representing a digital image to provide a coded representation, said method comprising the steps of:

(a) dividing the digital image into a plurality of blocks of pixels;

(b) transforming each block of pixels into a block of transform coefficients, where each transform coefficient is represented by a predefined bit sequence;

(c) rearranging the transform coefficients into a plurality of groups each having one or more subgroups of transform coefficients, wherein the transform coefficients of the same spatial frequency region are grouped together in the same group;

(d) selecting in turn each subgroup as a region and setting a predetermined maximum bitplane as the current bitplane;

(e) scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

(f) partitioning the selected region into two or more subregions having a predetermined form, and setting each of the subregions as the selected region; and (g) repeating steps (e) and (f) for each selected region in turn, commencing from the current bitplane until the predetermined minimum bitplane has been reached, or the selected region has a predetermined size, and coding the transform coefficients of the selected region and providing the coded transform coefficients in the coded representation.

7. A method as claimed in claim 6, wherein said transforming step includes transforming each block of pixels into a block of transform coefficients having a DC coefficient and AC coefficients in accordance with a two dimensional DCT transform.

8. A method as claimed in claim 7, wherein said rearranging step includes combining DC coefficients of the transform coefficients into a first group.

9. A method as claimed in claim 7, wherein each block of transform coefficients is a 8×8 block of coefficients having a DC transform coefficient and 63 AC transform coefficients and said rearranging step includes combining the DC coefficients into a first group, the AC01, AC10, and AC11 transform coefficients in a second group, the AC02, AC03, AC12, AC13, AC20, AC21, AC30, AC31, AC22, AC23, AC32, and AC33 transform coefficients in a third group, the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row jth column of the block.

10. A method as claimed in claim 8, wherein said rearranging step includes rearranging each of the groups other than the first group into three subgroups.

11. A method of encoding an image, the method comprising the steps of:

dividing the image into a plurality of blocks of pixels;

transforming the blocks of pixels into respective blocks of transform coefficients, wherein each block of transform coefficients is an 8×8 block of coefficients having a DC transform coefficient and 63 AC transform coefficients in accordance with a two-dimensional DCT transform, and wherein each block of transform coefficients comprises a plurality of subgroups of transform coefficients, wherein the subgroups of each block are associated with respective spatial frequency regions of the block of transform coefficients and are capable of being hierarchically inverse transformed to reproduce a number of resolutions of a sub-image of the image;

rearranging all the subgroups of transform coefficients from all the blocks into groups of transform coefficients, wherein each group comprises those subgroups associated with the same spatial frequency regions from all the blocks of transform coefficients and said rearranging step includes combining the DC coefficients into a first group, the AC01, AC10, and AC11 transform coefficients in a second group, the AC02, AC03, AC12, AC13, AC20, AC21, AC30, AC31, AC22, AC23, AC32, and AC33 transform coefficients in a third group, and the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row and jth column of the block; and encoding the groups in turn beginning with a first group and continuing in sequence through to a last group, wherein each group is encoded such that a decoder is capable of decoding each group substantially independently of any other group.

12. A method of encoding an image, the method comprising the steps of:

dividing the image into a plurality of blocks of pixels;

transforming the blocks of pixels into respective blocks of transform coefficients, wherein each block of transform coefficients comprises a plurality of subgroups of transform coefficients, wherein the subgroups of each block are associated with respective spatial frequency regions of the block of transform coefficients and are capable of being hierarchically inverse transformed to reproduce a number of resolutions of a sub-image of the image;

rearranging all the subgroups of transform coefficients from all the blocks into groups of transform coefficients, wherein each group comprises those subgroups associated with the same spatial frequency regions from all the blocks of transform coefficients and wherein said rearranging step includes rearranging each subgroup into one or more further subgroups of transform coefficients; and encoding the groups in turn beginning with a first group and continuing in sequence through to a last group, wherein each group is encoded such that a decoder is capable of decoding each group substantially independently of any other group, wherein said encoding step comprises the steps of:

selecting in turn each subgroup as a region and setting a predetermined maximum bitplane as the current bitplane;

scanning the significance of each bitplane of the selected region from the current bitplane towards a predetermined minimum bitplane, and providing a first token for each insignificant bitplane and a second token for a significant bitplane in the coded representation until a significant bitplane is determined and setting to determined significant bitplane as the current bitplane;

partitioning the selected region into two or more subregions having a predetermined form, and setting each of the subregion as the selected region; and repeating said scanning and partitioning steps for each selected region in turn, commencing from the current bitplane until the predetermined minimum bitplane has been reached, or the selected region has a predetermined size, and coding the transform coefficients of the selected region.

13. A method for decoding a coded representation of a digital image, the coded representation comprising in turn a plurality of encoded groups of transform coefficients, commencing with a first group and continuing in sequence through to a last group, the method comprising the steps of:

(a) selecting a resolution mode;

(b) decoding the encoded groups in turn beginning with the first encoded group and continuing in sequence until a number of encoded groups have been decoded, wherein the number is an integer and is determined in response to the resolution mode and wherein each encoded group comprises subgroups of transform coefficients, associated with the same spatial frequency regions from respective blocks of transform coefficients and wherein each subgroup comprises one or more further subgroups of transform coefficients;

(c) rearranging all of the subgroups of transform coefficients of the decoded groups into a plurality of m×m complete blocks of the transform coefficients, where m is an integer and is dependent on the selected resolution mode;

(d) inverse transforming each of the m×m block of transform coefficients, if necessary, to derive a block of pixels; and (e) combining the blocks of pixels to reconstitute the image at the selected resolution;

and wherein said decoding step comprises the sub-steps of:

selecting in turn each subgroup as a region;

scanning the coded representation associated with the selected region, the coded representation comprising a first token for each insignificant bitplane of the coefficients, a second token for each significant bitplane of the coefficients, and zero or more coded coefficients;

providing, if a first token is determined, an insignificant bitplane in an output stream for a current bitplane of coefficients of the selected region;

providing, if a second token is determined, a significant bitplane in the output stream for the current bitplane of the coefficients of the selected region and partitioning the selected region into two or more subregions having a predetermined form, and setting each of the subregions as the selected region; and repeating said scanning and providing sub-steps commencing from a predetermined bitplane until a predetermined minimum bitplane has been reached, or until the selected region has a predetermined size wherein a coded transform coefficient of the selected region is decoded; and providing the selected subgroups of decoded transform coefficients as an output.

14. A method for decoding a coded representation of a digital image, the image comprising a plurality of blocks of pixels having associated therewith blocks of transform coefficients which have been rearranged into a plurality of groups each comprising one or more subgroups of transform coefficients, said method comprising the steps of:

(a) selecting a resolution mode;

(b) decoding the groups in turn beginning with a first group and continuing in sequence until a number of groups have been decoded, wherein the number is determined in response to the resolution mode; and wherein said decoding step comprises the following sub-steps:

(b)(i) selecting in turn each subgroup of the groups to be decoded as a region;

(b)(ii) scanning the coded representation associated with the selected region, the coded representation comprising a first token for each insignificant bitplane of the coefficients, a second token for each significant bitplane of the coefficients, and zero or more coded coefficients;

(b)(iii) if a first token is determined, providing an insignificant bitplane in an output stream for a current bitplane of coefficients of the selected region;

(b)(iv) if a second token is determined, providing a significant bitplane in the output stream for the current bitplane of the coefficients of the selected region and partitioning the selected region into two or more subregions having a predetermined form, and setting each of the subregions as the selected region; and (b)(v) repeating steps (b)(ii) to (b)(iv) commencing from a predetermined bitplane until a predetermined minimum bitplane has been reached, or until the selected region has a predetermined size wherein a coded transform coefficient of the selected region is decoded; and (b)(vi) providing the selected subgroups of decoded transform coefficients as an output;

(c) rearranging all of the decoded transform coefficients of the selected subgroups into a plurality of n×n blocks of the transform coefficients, where n is an integer and is dependent on the selected resolution mode;

(d) inverse transforming each of the n×n block of transform coefficients, if necessary, to derive a n×n block of pixels; and (e) combining the blocks of pixels to reconstitute the digital image or a resolution thereof.

15. An image coding apparatus comprising:

means for dividing an image into a plurality of blocks of pixels;

means for transforming the blocks of pixels into respective blocks of transform coefficients in accordance with a two dimensional DCT transform, wherein each block of transform coefficients is a 8×8 block of coefficients having a DC transform coefficient and 63 AC transform coefficients;

means for rearranging the transform coefficients into a plurality of groups, wherein a first group comprises the DC coefficients, a second group comprises AC01, AC10 and AC11 transform coefficients, a third group comprises AC02, AC03, AC12, AC13, AC20, AC21, AC30, AC31, AC22, AC23, AC32, and AC33 transform coefficients, and a fourth group comprises AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients, where ACij is the AC component at the ith row and jth column of the block;

means for encoding the groups of coefficients by group, wherein each group is encoded such that a decoder is capable of decoding each group substantially independently of any other group.

16. An apparatus as claimed in claim 15, wherein said rearranging means rearranges the groups into one or more sub-groups of transform coefficients.

17. An apparatus as claimed in claim 16, wherein said rearranging means rearranges each of the groups other than the first group into three subgroups.

18. An apparatus as claimed in claim 17, wherein said transforming means comprises means for transforming each block of pixels into a block of transform coefficients, where each transform coefficient is represented by a predefined bit sequence.

19. An apparatus as claimed in claim 18, wherein said encoding means comprises:

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having a predetermined form, and setting each of the subregions as the selected region; and means for repeating the operations of the scanning and partitioning means for each selected region in turn, commencing from the current bitplane until the predetermined minimum bitplane has been reached, or the selected region has a predetermined size, and means for coding the transform coefficients of the selected region.

20. An apparatus for representing a digital image to provide a coded representation, said apparatus comprising:

means for dividing the digital image into a plurality of blocks of pixels;

means for transforming each block of pixels into a block of transform coefficients, where each transform coefficient is represented by a predefined bit sequence;

means for rearranging the transform coefficients into a plurality of groups each having one or more subgroups of transform coefficients, wherein the transform coefficients of the same spatial frequency region are grouped together in the same group;

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having predetermined form, and setting each of the subregions as the selected region;

means for repeating the operations of the scanning and partition means for each selected region in turn, commencing from the current bitplane until the predetermined minimum bitplane has been reached, or the selected region has a predetermined size; and means for coding the transform coefficients of the selected region, and for providing the coded transform coefficients in the coded representation.

21. An apparatus as claimed in claim 20, wherein the transforming means transforms each block of pixels into a block of transform coefficients having a DC coefficient and AC coefficients in accordance with a two-dimensional DCT transform.

22. An apparatus as claimed in claim 21, wherein the rearranging means combines DC coefficients of the transform coefficients into a first group.

23. An apparatus as claimed in claim 21, wherein each block of transform coefficient is an 8×8 block of coefficients having a DC transform coefficient and 63 AC transform coefficients and the rearranging means combines the DC coefficients into a first group, the AC01, AC10, and AC11 transform coefficients in a second group, the AC02, AC03, AC12, AC13, AC20, AC21, AC30, AC31, AC22, AC23, AC32, and AC33 transform coefficients in a third group, and the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row and jth column of the block.

24. An apparatus as claimed in claim 22, wherein said rearranging means rearranges each of the groups other than the first group into three subgroups.

25. An apparatus for encoding an image, the apparatus comprising:

means for dividing the image into a plurality of blocks of pixels;

means for transforming the blocks of pixels into respective blocks of transform coefficients, wherein each block of transform coefficients comprises a plurality of subgroups of transform coefficients, where the subgroups of each block are associated with respective spatial frequency regions of the block of transform coefficients and are capable of being hierarchically inverse transformed to reproduce a number of resolutions of a sub-image of the image;

means for rearranging all subgroups of transform coefficients from all the blocks into groups of transform coefficients, wherein each group comprises those subgroups associated with the same spatial frequency regions from all the blocks of transform coefficients; and means for encoding the groups turn beginning with a first group and continuing in sequence through to a last group, wherein each group is encoded such that a decoder is capable of decoding each group substantially independently of any other group, wherein each block of transform coefficients is an 8×8 block of coefficients having a DC transform coefficient and 63 AC transform coefficients in accordance with a two-dimensional DCT transform and the rearranging means combines the DC coefficients into a first group, the AC01, AC10, and AC11 transform coefficients in a second group, the AC02, AC03, AC12, AC13, AC20, AC21, AC30, AC31, AC22, AC23, AC32, and AC33 transform coefficients in a third group, and the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row and jth column of the block.

26. An apparatus for encoding an image, the apparatus comprising:

means for dividing the image into a plurality of blocks of pixels;

means for transforming the blocks of pixels into respective blocks of transform coefficients, wherein each block of transform coefficients comprises a plurality of subgroups of transform coefficients, where the subgroups of each block are associated with respective spatial frequency regions of the block of transform coefficients and are capable of being hierarchically inverse transformed to reproduce a number of resolutions of a sub-image of the image;

means for rearranging all the subgroups of transform coefficients from all the blocks into groups of transform coefficients, wherein each group comprises those subgroups associated with the same spatial frequency regions from all the blocks of transform coefficients and said rearranging means rearranges each subgroup into one or more further subgroups of transform coefficients; and means for encoding the groups turn beginning with a first group and continuing in sequence through to a last group, wherein each group is encoded such that a decoder is capable of decoding each group substantially independently of any other group, wherein said encoding means comprises:

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having a predetermined form, and setting each of the subregions as the selected region; and means for repeating the operations of the scanning and partition means for each selected region in twin, commencing from the current bitplane until the predetermined minimum bitplane has been reached, or the selected region has a predetermined size, and means for coding the transform coefficients of the selected region.

27. An apparatus for decoding a coded representation of a digital image, the coded representation comprising in turn a plurality of encoded groups of transform coefficients, commencing with a first group and continuing in sequence through to a last group, the apparatus comprising:

means for selecting a resolution mode;

means for decoding the encoded groups in turn beginning with a first encoded group and continuing in sequence until a number of encoded groups have been decoded, wherein the number is an integer and is determined in responsible to the resolution mode and wherein each encoded group comprises subgroups of transform coefficients associated with the same spatial frequency regions from respective blocks of transform coefficients;

means for rearranging all of the subgroups of transform coefficients of the decoded groups into a plurality of m×m complete blocks of the transform coefficients, where m is an integer and is dependent on the selected resolution mode;

means for inverse transforming each of the m×m block of transform coefficients, if necessary, to derive a block of pixels; and means for combining the blocks of pixels to reconstitute the image at the selected resolution, wherein each subgroup comprises one or more further subgroups of transform coefficients and said decoding means comprises:

means for selecting in turn each subgroup as a region;

means for scanning the coded representation associated with the selected region, the coded representation comprising a first token for each insignificant bitplane of the coefficients, a second token for each significant bitplane of the coefficients, and zero or more coded coefficients;

means for providing, if a first token is determined, an insignificant bitplane in an output stream for a current bitplane of coefficients of the selected region;

means for providing, if a second token is determined, a significant bitplane in the output stream for the current bitplane of the coefficients of the selected region and partitioning the selected region into two or more subregions having a predetermined form, and setting each of the subregions as the selected region; and means for repeating the operations of the scanning means and both the providing means, commencing from a predetermined bitplane until a predetermined minimum bitplane has been reached, or until the selected region has a predetermined size wherein a coded transform coefficient of the selected region is decoded; and means for providing the selected subgroups of decoded transform coefficients as an output.

28. An apparatus for decoding a coded representation of a digital image, the image comprising a plurality of blocks of pixels having associated therewith blocks of transform coefficients which have been rearranged into a plurality of groups each comprising one or more subgroups of transform coefficients, said apparatus comprising:

(a) means for selecting a resolution mode;

(b) means for decoding the groups in turn beginning with a first group and continuing in sequence until a number of groups have been decoded, wherein the number is determined in response to the resolution mode; and wherein said decoding means comprises:

(b)(i) means for selecting in turn each subgroup of the groups to be decoded as a region;

(b)(ii) means for scanning the coded representation associated with the selected region, the coded representation comprising a first token for each insignificant bitplane of the coefficients, a second token for each significant bitplane of the coefficients, and zero or more coded coefficients;

(b)(iii) means for, if a first token is determined, providing an insignificant bitplane in an output stream for a current bitplane of coefficients of the selected region;

(b)(iv) means for, if a second token is determined, providing a significant bitplane in the output stream for the current bitplane of the coefficients of the selected region and partitioning the selected region into two or more subregions having a predetermined form, and setting each of the subregions as the selected region; and (b)(v) means for repeating the operations of the scanning means and both providing means, commencing from a predetermined bitplane until a predetermined minimum bitplane has been reached, or until the selected region has a predetermined size wherein a coded transform coefficient of the selected region is decoded; and (b)(vi) means for providing the selected subgroups of decoded transform coefficients as an output;

(c) means for rearranging all of the decoded transform coefficients of the selected subgroups into a plurality of n×n blocks of the transform coefficients, where n is an integer and is dependent on the selected resolution mode;

(d) means for inverse transforming each of the n×n block of transform coefficients, if necessary, to derive a n×n block of pixels; and (e) means for combining the blocks of pixels to reconstitute the digital image or a resolution thereof.

29. A computer program product comprising a computer readable medium having recorded thereon a computer program for image coding, the computer program product comprising:

means for dividing an image into a plurality of blocks of pixels;

means for transforming the blocks of pixels into respective blocks of transform coefficients in accordance with a two dimensional DCT transform, wherein each block of transform coefficients is an 8×8 block of coefficients having a DC transform coefficient and 63 AC transform coefficients;

means for rearranging the transform coefficients into a plurality of groups, wherein a first group comprises the DC coefficients, a second group comprises AC01, AC10 and AC11 transform coefficients, a third group comprises AC02, AC03, AC12, AC13, AC20, AC21, AC30, AC31, AC22, AC23, AC32, and AC33 transform coefficients, and a fourth group comprises AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients, where ACij is the AC component at the ith row and jth column of the block; and means for encoding the groups of coefficients by group, wherein each group is encoded such that a decoder is capable of decoding each group substantially independently of any other group.

30. A computer program product as claimed in claim 29, wherein said rearranging means rearranges the groups into one or more sub-groups of transform coefficients.

31. A computer program product as claimed in claim 30, wherein said rearranging means rearranges each of the groups other than the first group into three subgroups.

32. A computer program product as claimed in claim 31, wherein said transforming means comprises means for transforming each block of pixels into a block of transform coefficients, where each transform coefficient is represented by a predefined bit sequence.

33. A computer program product as claimed in claim 32, wherein said encoding means comprises:

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having a predetermined form, and setting each of the subregions as the selected region; and means for repeating the operations of the scanning and partitioning means for each selected region in turn, commencing from the current bitplane until the predetermined minimum bitplane has been reached, or the selected region has a predetermined size; and means for coding the transform coefficients of the selected region.

34. A computer program product comprising a computer readable medium having recorded thereon a computer program for representing a digital image to provide a coded representation, said computer program product comprising:

means for dividing the digital image into a plurality of blocks of pixels;

means for transforming each block of pixels into a block of transform coefficients, where each transform coefficient is represented by a predefined bit sequence;

means for rearranging the transform coefficients into a plurality of groups each having one or more subgroups of transform coefficients, wherein the transform coefficients of the same spatial frequency region are grouped together in the same group;

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having a predetermined form, and setting each of the subregions as the selected region; and means for repeating the operations of the scanning and partition means for each selected region in turn, commencing from the current bitplane until the predetermined minimum bitplane has been reached, or the selected region has a predetermined size, and means for coding the transform coefficients of the selected region, and for providing the coded transform coefficients in the coded representation.

35. A computer program product as claimed in claim 34, wherein the transforming means transforms each block of pixels into a block of transform coefficients having a DC coefficient and AC coefficients in accordance with a two-dimensional DCT transform.

36. A computer program product as claimed in claim 35, wherein the rearranging means combines DC coefficients of the transform coefficients into a first group.

37. A computer program product as claimed in claim 35, wherein each block of transform coefficients is an 8×8 block of coefficients having a DC transform coefficient and 63 AC transform coefficients and the rearranging means combines the DC coefficients into a first group, the AC01, AC10 and AC11 transform coefficients in a second group, the AC02, AC03, AC12, AC13, AC20, AC21, AC30, AC31, AC22, AC23, AC32, and AC33 transform coefficients in a third group, and the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row and jth column of the block.

38. A computer program product as claimed in claim 36, wherein said rearranging means rearranges each of the groups other than the first group into three subgroups.

39. A computer program product comprising a computer readable medium having recorded thereon a computer program for encoding an image, the computer program product comprising:

means for dividing the image into a plurality of blocks of pixels;

means for transforming the blocks of pixels into respective blocks of transform coefficients, wherein each block of transform coefficients comprises a plurality of subgroups of transform coefficients, wherein the subgroups of each block are associated with respective spatial frequency regions of the block of transform coefficients and are capable of being hierarchically inverse transformed to reproduce a number of resolutions of a sub-image of the image;

means for rearranging all the subgroups of transform coefficients from all the blocks into groups of transform coefficients, wherein each group comprises those subgroups associated with the same spatial frequency regions from all the blocks of transform coefficients; and means for encoding the groups turn beginning with a first group and continuing in sequence through to a last group, wherein each group is encoded such that a decoder is capable of decoding each group substantially independently of any other group, wherein each block of transform coefficients is an 8×8 block of coefficients having a DC transform coefficient and 63 AC transform coefficients in accordance with a two-dimensional DCT transform and the rearranging means combines the DC coefficients into a first group, the AC01, AC10, and AC11 transform coefficients, in a second group, the AC02, AC03, AC12, AC13, AC20, AC21, AC30, AC31, AC22, AC23, AC32 and AC33 transform coefficients in a third group, and the AC04, AC05, AC06, AC07, AC14, AC15, AC16, AC17, AC24, AC25, AC26, AC27, AC34, AC35, AC36, AC37, AC40, AC50, AC60, AC70, AC41, AC51, AC61, AC71, AC42, AC52, A62, AC72, AC43, AC53, AC63, AC73, AC44, AC45, AC46, AC47, AC54, AC55, AC56, AC57, AC64, AC65, A66, AC67, AC74, AC75, AC76, and AC77 transform coefficients in a fourth group, where ACij is the AC component at the ith row and jth column of the block.

40. A computer program product comprising a computer readable medium having recorded thereon a computer program for encoding an image, the computer program product comprising:

means for dividing the image into a plurality of blocks of pixels;

means for transforming the blocks of pixels into respective blocks of transform coefficients; wherein each block of transform coefficients comprises a plurality of subgroups of transform coefficients, and wherein the subgroups of each block are associated with respective spatial frequency of the block of transform coefficients and are capable of being hierarchically inverse transformed to reproduce a number of resolutions of a sub-image of the image;

means for rearranging all the subgroups of transform coefficients from all the blocks into groups of transform coefficients, wherein each group comprises those subgroups associated with the same spatial frequency regions from all the blocks of transform coefficients and said rearranging means rearranges each subgroup into one or more further subgroups of transform coefficients; and means for encoding the groups turn beginning with a first group and continuing in sequence through to a last group, wherein each group is encoded such that a decoder is capable of decoding each group substantially independently of any other group, wherein said encoding means comprises:

means for selecting in turn each subgroup as a region and setting a predetermined maximum bitplane as the current bitplane;

means for scanning the significance of each bitplane of the selected region from the current bitplane towards a predetermined minimum bitplane, and providing a first token for each insignificant bitplane and a second token for a significant bitplane in the coded representation until a significant bitplane is determined and setting the determined significant bitplane as the current bitplane;

means for partitioning the selected region into two or more subregions having a predetermined form, and setting each of the subregions as the selected region; and means for repeating the operations of the scanning and partition means for each selected region in turn, commencing from the current bitplane until the predetermined minimum bitplane has been reached, or the selected region has a predetermined size, and means for coding the transform coefficients of the selected region.

41. A computer program product comprising a computer readable medium having recorded thereon a computer program for decoding a coded representation of a digital image, the coded representation comprising in turn a plurality of encoded groups of transform coefficients, commencing with a first group and continuing in sequence through to a last group, the computer program product comprising:

means for selecting a resolution mode;

means for decoding the encoded groups in turn beginning with a first encoded group and continuing in sequence until a number of encoded groups have been decoded wherein the number is an integer and is determined in response to the resolution mode and wherein each encoded group comprises subgroups of transform coefficients associated with the same spatial frequency regions from respective blocks of transform coefficients;

means for rearranging all of the subgroups of transform coefficients of the decoded groups into a plurality of m×m complete blocks of the transform coefficients, where m is an integer and is dependent on the selected resolution mode, means for inverse transforming each of the m×m block of transform coefficients, if necessary, to derive a block of pixels; and means for combining the blocks of pixels to reconstitute the image at the selected resolution, wherein each subgroup comprises one or more further subgroups of transform coefficients and said decoding means comprises:

means for selecting in turn each subgroup as a region;

means for scanning the coded representation associated with the selected region, the coded representation comprising a first token for each insignificant bitplane of the coefficients, a second token for each significant bitplane of the coefficients, and zero or more coded coefficients;

means for providing, if a first token is determined, an insignificant bitplane in an output stream for a current bitplane of coefficients of the selected region;

means for providing, if a second token is determined, a significant bitplane in the output stream for the current bitplane of the coefficients of the selected region and partitioning the selected region into two or more subregions having a predetermined form, and setting each of the subregions as the selected region; and means for repeating the operations of the scanning means and both the providing means, commencing from a predetermined bitplane until a predetermined minimum bitplane has been reached, or until the selected region has a predetermined size wherein a coded transform coefficient of the selected region is decoded; and means for providing the selected subgroups of decoded transform coefficients as an output.

42. A computer program product comprising a computer readable medium having recorded thereon a computer program for decoding a coded representation of a digital image, the image comprises a plurality of blocks of pixels having associated therewith blocks of transform coefficients which have been rearranged into a plurality of groups each comprising one or more subgroups of transform coefficients, said computer program product comprising:

(a) means for selecting a resolution mode;

(b) means for decoding the groups in turn beginning with a first group and continuing in sequence until a number of groups have been decoded, wherein the number is determined in response to the resolution mode; and wherein said decoding means comprises:

(b)(i) means for selecting in turn each subgroup of the groups to be decoded as a region;

(b)(ii) means for scanning the coded representation associated with the selected region, the coded representation comprising a first token for each insignificant bitplane of the coefficient, a second token for each significant bitplane of the coefficients, and zero or more coded coefficients;

(b)(iii) means for, if a first token is determined, providing an insignificant bitplane in an output stream for a current bitplane of coefficients of the selected region;

(b)(iv) means for, if a second token is determined, providing a significant bitplane in the output stream for the current bitplane of the coefficients of the selected region and partitioning the selected region into two or more subregions having a predetermined form, and setting each of the subregions as the selected region; and (b)(v) means for repeating the operations of the scanning means and both providing means, commencing from a predetermined bitplane until a predetermined minimum bitplane has been reached, or until the selected region has a predetermined size wherein a coded transform coefficient of the selected region is decoded; and (b)(vi) means for providing the selected subgroups of decoded transform coefficients as an output;

(c) means for rearranging all of the decoded transform coefficients of the selected subgroups into a plurality of n×n blocks of the transform coefficients, where n is an integer and is dependent on the selected resolution mode;

(d) means for inverse transforming each of the n×n block of transform coefficients, if necessary, to derive a n×n block of pixels; and (e) means for combining the blocks of pixels to reconstitute the digital image or a resolution thereof.

* * * * *